United States Patent [19]

Kinney et al.

[11] Patent Number: 4,778,270

[45] Date of Patent: Oct. 18, 1988

[54] SPECTRAL OPTIC TEMPERATURE SENSOR

[75] Inventors: Terrance R. Kinney; Stephen M. Emo, both of South Bend, Ind.; John H. Kimble, Niles, Mich.

[73] Assignee: Allied Corporation, Morristown, N.J.

[21] Appl. No.: 4,735

[22] Filed: Jan. 20, 1987

[51] Int. Cl.$^4$ ............... G01J 5/08; G01J 5/58; G01K 11/12

[52] U.S. Cl. ................... 356/43; 356/45; 356/136; 374/161

[58] Field of Search ............ 356/43, 44, 45, 128, 356/134, 135, 136, 137; 374/161, 162

[56] References Cited

U.S. PATENT DOCUMENTS

| | | | |
|---|---|---|---|
| 4,223,216 | 9/1980 | Quick et al. | 250/226 |
| 4,334,152 | 6/1982 | Dakin et al. | 250/226 |
| 4,660,974 | 4/1987 | Mächler et al. | 356/128 |
| 4,666,304 | 5/1987 | Davies | 356/375 |

FOREIGN PATENT DOCUMENTS

| | | | |
|---|---|---|---|
| 56-112620 | 9/1981 | Japan | 374/161 |
| 61-11637 | 1/1986 | Japan | 356/136 |
| 1555130 | 11/1979 | United Kingdom | |
| 2141223 | 12/1984 | United Kingdom | 356/128 |

OTHER PUBLICATIONS

Patent Abstracts of Japan, vol. 9, No. 33 (P-334) (1756), Feb. 13, 1985.
Patent Abstracts of Japan, vol. 9, No. 6 (P-326) (1729), Jan. 11, 1985.
Patent Abstracts of Japan, vol. 11, No. 72 (P-554) (2519), Mar. 5, 1987.

*Primary Examiner*—Vincent P. McGraw
*Attorney, Agent, or Firm*—Leo H. McCormick, Jr.; Ken C. Decker

[57] ABSTRACT

The invention is a temperature sensor which uses the variation in the critical angle between two optically transparent media, at least one of which has an index of refraction variable as a function of temperature, to variably refract and reflect portions of a spectrum incident on the junction of the media at angles less than and greater than the critical angle to produce an optical signal variable as a function of temperature.

13 Claims, 1 Drawing Sheet

SPECTRAL OPTIC TEMPERATURE SENSOR

BACKGROUND OF THE INVENTION

The present invention relates to devices ror measuring temperature and in particular to a device which utilizes the variation in the index of refraction with temperature of various materials and a light spectrum refracted therethrough and reflected thereby to provide a device which can sense temperature to a high degree of accuracy and which enables transmission of the signal containing the temperature intelligence via fiber optic conductors.

Various devices are presently known for sensing and transmitting signals indicative of temperature. These devices include thermocouples, platinum resistance thermometers, Bourdon tubes, and the like to mention a few. When such devices are utilized in conjunction with electronic controls, the controls typically being located remotely from the sensed temperature, it is common to transmit the data by means of electrical conductors. Such conductors are subject to electricl noise, EMI, EMP, and other induced electrical effects. Such devices typically produce data in analog format such that the data must subsequently be converted from analog to digital format for processing in contemporary computer control circuits. Many of these devices which exhibit high degrees of accuracy are correspondingly fragile and subject to destruction or inaccurate operation in a hostile environment.

There therefore exists a need for a temperature sensing device operable in hostile environments which is capable of producing a highly accurate temperature reading, capable of transmitting a signal corresponding to the temperature reading by means resistant to electrical noise, and to provide such a device which is very rugged, reasonably inexpensive to produce, and which is small in size.

Broadly, the present invention is an optical spectral temperature sensor which comprises means for generating a beam of radiant energy of predetermined spectral bandwidth, a first optically transparent medium having a first index of refraction and optical dispersing means for generating a spectral dispersion of said beam as a function of wavelength into said first medium. A second optical medium having an index of refraction variable as a function of temperature is disposed contiguous to the first medium in a position to intercept a portion of the spectral dispersion and reflect and diffract portions of the spectrum at angles greater than and less than the critical angle of incidence, respectively, as a function of the difference of the indices of refraction of the first and said second optically transparent media. Means are provided for sensing the displacement of the spectral dispersion variably diffracted as a function of temperature by said optically transparent media.

It is therefore an object of the invention to provide a temperature sensor utilizing an optically transparent medium having an index of refraction variable as a function of temperature to variably refract and reflect portions of a spectrum of radiant energy as a function of temperature.

Another object of the invention is to provide such a temperature sensor utilizing a dispersion of a beam of light with a predetermined bandwidth and the variation in the indices of refraction of optically transparent media as a function of temperature to produce a variably refracted optical spectrum as a function of temperature.

Yet another object of the invention is to provide such a temperature sensor made of materials which permit the sensor to operate in high temperature environments.

Still another object of the invention is to produce such an optical temperature sensor which is stable and produces a temperature reading to a high degree of accuracy.

Another object of the invention is to produce an optical temperature sensor which produces a digitally compatible output signal.

Yet another object of the invention is to produce a temperature sensor which permits interconnection thereof with an electronic device by means of optical fiber conductors.

Still another object of the invention is to produce an optical temperature sensor which operates without an external power source and which is small in size and rugged in construction.

BRIEF DESCRIPTION OF THE DRAWINGS

These and other objects and purposes of the invention and the operation of the invention itself will be best understood in view of the following detailed description thereof taken in conjunction with the appended drawings wherein.

DESCRIPITON OF THE PREFERRED EMBODIMENT

Figure 1:
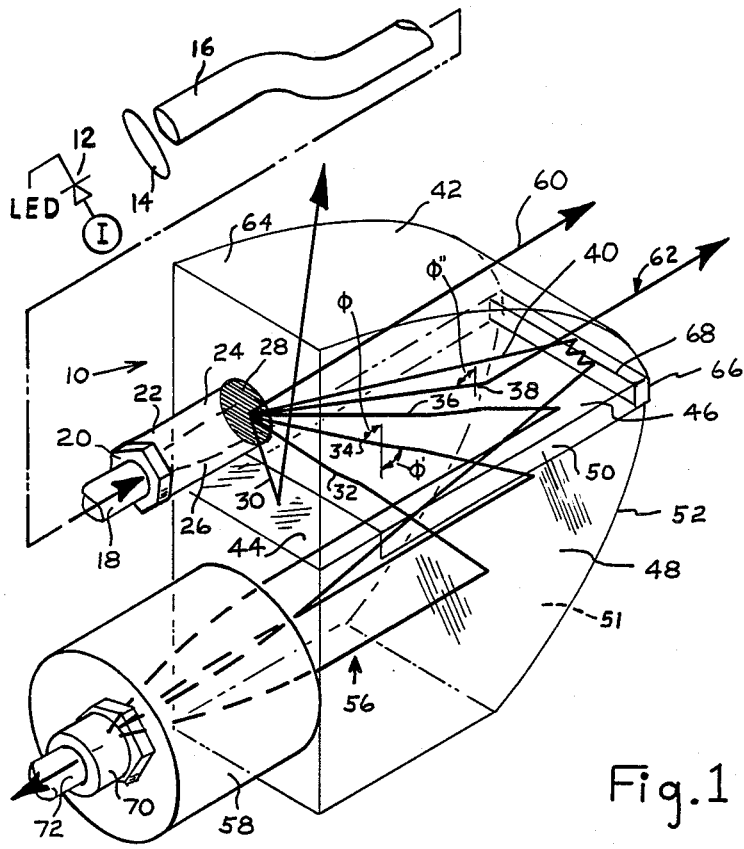
FIG. 1 is an isometric illustration of the optical temperature sensor of the present invention.

Referring first to FIG. 1, there is shown an isometric view of an optical spectral temperature sensor made in accordance with the present invention indicated generally at 10. The sensor comprises a light source 12 which generates light having a significant spectral bandwidth. Light from the source 12 is focussed by lens 14 into one end 16 of an optical fiber conductor 18. Conductor 18 is of the single fiber type and delivers the collimated light at its end 20. End 20 is connected by means of a conventional fiber optic connector 22 to a graded index lens 24 which produces a substantially parallel beam of light at 26 which impinges upon a dispersion grating 28. The grating 28 disperses the beam 26 as a function of the wavelength of the light to produce an optical spectrum. The spectrum is indicated as a plurality of rays 30, 32, 34, 36, 38 and 40. It will be understood that while six rays are illustrated, the spectrum will in fact comprise a substantially continuous spectrum of light comprising a large number of frequencies or elements dispersed as a function of their frequency or wavelength. The spectrum is dispersed into a first optical medium 42, typically an element made of quartz glass or similarly optically transparent material. In addition to being optically transparent and a good optical conductor, the material of medium 42 exhibits a substantially constant index of refraction over a very wide range of temperatures.

Contiguous to one wall 44 of medium 42 there is disposed a cavity 46 extending substantially parallel to the optical axis of dispersion grating 28 and defined by the medium 42 and a second body 48, the latter also being made of the same optically transparent substantially constant index of refraction material as the medium 42. Within the cavity 46 is disposed an optically transparent material 50. The material 50 is characterized in that it has an index of refraction that is different from that of the medium 42 and in that the index of refraction thereof varies substantially linearly as a function of its temperature. Typical of such materials are many liquids and gases as well as some crystals and plastics.

The body 48 is provided with a curved surface 52 and coated with a reflective material such that it functions as a reflecting lens to collimate light rays such as ray 32 into a beam indicated generally at 56. The beam 56 is then refocused by a second graded index lens 58 into another optical fiber conductor 72. The light is then conducted to a suitable optical spectral analyzer.

In operation, light from the source 12 passes via the optical fiber conductor 18 into the graded index lens 24 where it is collimated into the beam 26. The beam 26 impinges upon dispersion grating 28 where it is dispersed forming a spectrum. The spectrum is illustrated graphically by the rays 30 through 40. Those portions of the spectrum represented by the rays 60, 62 simply pass through the transparent medium 42 and exit therefrom through the surface 64. A portion of the spectrum represented by ray 30 impinge upon reflective surface 44 and are reflected outwardly through the surface 64. A band of the spectrum represented by the rays 32 through 36 are incident on the junction between media 42 and 50. This portion of the spectrum is refracted as a result of the difference in the indices of refraction of media 42 and 50. Subsequently, these rays pass through the junction between media 50 and 48 and are again bent passing on to body 48 where they are reflected and collimated by the focusing surface 52 into the graded index lens 58. The angle $\phi'$ prime is determined by Snell's law which states that $n \sin \phi = n' \sin \phi'$
where n and n' are the indices of refraction of the media
42 and 50 and the angles and denote the angle of incidence of the rays with respect to the junction between the media and a surface normal thereto.
Further, according to Snell's law, there is an angle at which the angle $\phi'$ is equal to 90 degrees. All rays striking the surface at this angle or greater will be totally reflected as indicated by the ray 38. This is commonly called the critical angle. Lastly, rays denoted by ray 40 do not impinge on the junction of the media and are multiply reflected by reflecting surfaces 66, 68 and ultimately are reflected through the medium 48 to the lens 58.

The critical angle can be determined from the relationship $$\sin \phi'' = n'/n$$

Figure 2:
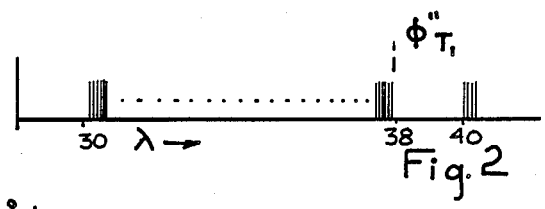
FIGS. 2 and 3 are spectral charts useful in explaining the operation of the invention.
Figure 3:
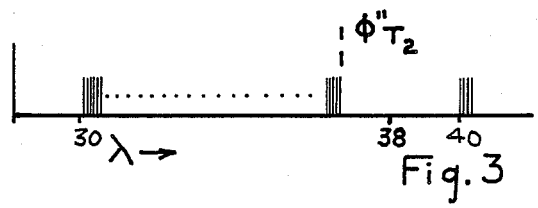

Since the index of refraction n of the medium 42 is substantially constant, it will be seen that the critical angle $\phi''$ varies as a function of the index of refraction n' of the medium 50. Further, since the index of refraction of the medium 50 varies substantially linearly as a function of temperature, it will be seen that the critical angle will also vary substantially linearly as a function of temperature. By positioning the medium 50 such that a spectral band is incident thereon at angles that are greater and smaller than the critical angle $\phi''$, the portions of the spectrum that are refracted and reflected by the medium 50 will vary as a function of the variation in the index of refraction of medium 50. This variation in the critical angle produces an effect on the spectrum transmitted through medium 50 as shown in FIGS. 2 and 3. When the indices of refraction and n' are at first predetermined values, that is, n constant and n' at a specific value determined by the temperature of the medium 50, the spectrum transmitted through the medium 50 will be as shown in FIG. 2 where individual increments of the spectrum are again indicated by the numerals 30 through 40. That portion of the spectrum denominated 30 is fully reflected by the surface 44 and is therefore a "black" reference. Those portions of the spectrum that do not impinge upon the medium 50 are fully reflected and produce a constant or "white" reference 40. Rays 32 through 36 are transmitted through the medium 50 while, the portions of the spectrum represented by the ray 38 are totally reflected. When the spectrum is again reconcentrated into a beam by the lens 58, the light in the beam will comprise the spectrum represented by FIG. 2.

If the index of refraction of the medium 50 now changes as a consequence of a change in temperature thereof, the index of refraction of the medium 42 remaining relatively constant, the critical angle $\phi''$ will change. Since the index of refraction of the medium 50 will decrease with increasing temperature, it will be seen that the critical angle $\phi''$ decreases. Accordingly, less of the spectrum will be incident upon the junction of the media 42 and 50 at an angle greater than the critical angle resulting in the transmission of a narrower band of the spectrum. This is represented by FIG. 3 where, at some predetermined temperature, the ray denominated 38 will also pass through the media 50 and will be included in the spectrum of the beam reconcentrated by the lens 58.

Since in fact the spectrum is comprised of a very large number of increments, very small shifts in the spectral content of the beam can be sensed. The modified spectrum is then retransmitted either by a second optic fiber conductor 70 or by means of a two to one optical connector (not shown) and back to a spectral analyzer.

In a working embodiment of the invention, the index of refraction of the medium 42 is selected to be greater than that of medium 50. Both media may be solid or one of the media may comprise a fluid. It should further be noted that while the invention has been described using a medium 42 of substantially constant index of refraction (with respect to temperature), the invention can also be made using two materials both of which exhibit a change in their index of refraction as a function of temperature. In this case $$n_1 - n_2 = f(T)$$

From the above description it will now be seen that the present invention provides a unique temperature sensor which is capable of producing a spectral modification of a beam of light having a predetermined bandwidth by refracting the beam through a medium having an index of refraction variable with respect to temperature. The device can be manufactured in a very small package utilizing techniques similar to those used to produce micro circuits. The materials utilized for the device can be selected to provide a device having high temperature and physical tolerance. No external power supply is required and because all connections are effected utilizing optical fiber conductors, the device is extremely resistant to EMI, EMP, and other induced electrical effects. Various materials, typically fluids, such as silicon oil, alcohol, and the like can be utilized for the medium 50 to provide temperature sensors of variable range and sensitivity.

Although the present invention has been illustrated and described in connection with example embodiments, it will be understood that this is illustrative of the invention, and is by no means restrictive, thereof. It is reasonable to be expected that those skilled in the art can make numerous revisions and additions to the invention and it is intended that such revisions and additions will be included in the scope of the following claims as equivalents of the invention.

What is claimed is:

1. An optical spectral temperature sensor comprising:
   means for generating a beam of light of predetermined spectral bandwidth;
   dispersing means optically disposed to receive said beam of light for dispersing said beam as a function of wavelength to generate a diverging spectrum;
   a first optically transparent medium;
   a second optically transparent medium contiguous with said first medium and optically disposed to receive portions of said spectrum at angles of incidence ranging from less than to greater tha a critical angle of incidence determined by the indices of refraction of said first and said second optically transparent media, the index of refraction of at least one of said media being variable as a function of temperature, whereby, those components of said diverging spectrum striking said second optically transparent medium at an angle less than said critical angle are refracted through said second medium and at an angle greater than said critical angle are reflected by said second medium, said refracted and reflected portions of said diverging spectrum being a function of the temperature of at least one of said media;
   collimating lens means disposed to receive the refracted portion of said diverging spectrum to collimate same;
   condensing lens means optically disposed to receive said collimated spectrum and form a beam comprising the refracted portion of said spectrum;
   a first reflecitng surface optically disposed to reflect a predetermined element of sid diverging spectrum directly to said condensing means to define a first reference spectral element; and
   means for communicating said beam and first reference spectral element to a spectral analyzer.

2. The sensor of claim 1 further including a second reflecting surface disposed to reflect a second predetermined element of said diverging spectrum away from said second medium and said condensing lens means, whereby, said second predetermined element of said spectrum defines a second reference spectral element.

3. The sensor of claim 5 further includes optical fiber conductors connected to transmit said beam to said dispersing means and to said condensing lens to conduct light to and from said sensor and a remote location.

4. The sensor of claim 1 wherein the optical axis of said dispersing means and the contiguous surface of said second optically transparent medium are substantially parallel.

5. The sensor of claim 4 further including a collimating lens optically interposed between an optic fiber conductor and said dispersing means.

6. The sensor of claim 5 wherein said collimating lens and said condensor lens means are graded index lenses.

7. The sensor of claim 1 wherein both said first and said second media are solids.

8. The sensor of claim 1 wherein the index of refraction of said first medium is greater than the index of refraction of said second medium.

9. The sensor of claim 1 wherein the indices of refraction of both said first and said second media are variable as a function of temperature.

10. The sensor as recited in claim 1 wherein a change in temperature of both said first and second media produce a corresponding but dissimilar change in the index of refraction of both said first and second media.

11. The sensor as recited in claim 1, wherein said index of refraction of said first optical transparent medium is greater than the index of refraction of said second medium.

12. The sensor as recited in claim 11, wherein said first and second media are solid.

13. The sensor as recited in claim 11, wherein said first medium is a solid and said second medium is a fluid.

* * * * *